United States Patent
Bensmann

(10) Patent No.: US 11,794,908 B2
(45) Date of Patent: Oct. 24, 2023

(54) FLOW BODY FOR AN AIRCRAFT HAVING AN INTEGRATED DE-ICING SYSTEM

(71) Applicant: Airbus Operations GmbH, Hamburg (DE)

(72) Inventor: Stefan Bensmann, Weyhe (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 17/615,074

(22) PCT Filed: Aug. 27, 2020

(86) PCT No.: PCT/EP2020/073968
§ 371 (c)(1),
(2) Date: Nov. 29, 2021

(87) PCT Pub. No.: WO2021/037976
PCT Pub. Date: Mar. 4, 2021

(65) Prior Publication Data
US 2022/0219825 A1  Jul. 14, 2022

(30) Foreign Application Priority Data
Aug. 30, 2019  (DE) .......................... 102019123276.7

(51) Int. Cl.
*B64D 15/16*  (2006.01)
(52) U.S. Cl.
CPC ................... *B64D 15/163* (2013.01)
(58) Field of Classification Search
CPC ................................. B64D 15/163
See application file for complete search history.

(56) References Cited

U.S. PATENT DOCUMENTS 2,135,119 A   11/1938  Wood
2,214,919 A *  9/1940  Burgess ................. B64D 15/16
                                           244/134 A
(Continued)

FOREIGN PATENT DOCUMENTS

DE    2026054 A    12/1970
EP    2727825 A1    5/2014
(Continued)

OTHER PUBLICATIONS

International Search Report; priority document.
German Search Report; priority document.

*Primary Examiner* — Justin M Benedik
(74) *Attorney, Agent, or Firm* — Greer, Burns & Crain, Ltd.

(57) ABSTRACT

A flow body for an aircraft with an integrated de-icing system. The flow body includes a front skin, an internal structural component, a lever having first and second ends, with an attachment point in-between, and an actuator. The actuator is spaced inside the front skin. The lever extends from the actuator to a front skin inner surface, the first end coupling with the front skin, and the second end coupling with the actuator. The attachment point is swivably supported on the internal structural component. The attachment joint is closer to the first end than the second end. The lever and the actuator apply an impulsive force in a transverse direction to the lever, such that the lever rotates around the attachment point, and such the first end urges the front skin to locally elastically deform for removing ice accretion from an outer side of the front skin.

17 Claims, 2 Drawing Sheets

(56) References Cited

U.S. PATENT DOCUMENTS

| | | | |
|---|---|---|---|
| 2,797,951 A | | 7/1957 | McLean et al. |
| 4,399,967 A | * | 8/1983 | Sandorff ............... B64D 15/163 |
| | | | 244/134 R |
| 4,458,865 A | * | 7/1984 | Sandorff ............... B64D 15/163 |
| | | | 244/134 R |
| 4,501,398 A | * | 2/1985 | Sandorff ............... B64D 15/163 |
| | | | 244/134 R |
| 8,517,313 B2 | * | 8/2013 | Gornik .................... B64D 15/20 |
| | | | 244/134 F |
| 9,592,904 B2 | * | 3/2017 | Kirn .......................... B64C 3/48 |
| 9,598,167 B2 | * | 3/2017 | Grip .......................... B64C 3/26 |
| 9,889,940 B2 | * | 2/2018 | Lenkey .................. B64D 15/16 |
| 2010/0206990 A1 | * | 8/2010 | Petrenko ............. B64D 15/163 |
| | | | 62/331 |
| 2013/0299638 A1 | | 11/2013 | Gornik |
| 2016/0185443 A1 | * | 6/2016 | Rawdon .................... B64C 3/48 |
| | | | 244/219 |

FOREIGN PATENT DOCUMENTS

| | | |
|---|---|---|
| EP | 2883787 A1 | 6/2015 |
| EP | 2915741 A1 | 9/2015 |
| EP | 3248882 A1 | 11/2017 |
| GB | 523108 A | 7/1940 |
| WO | 2009019696 A2 | 2/2009 |

\* cited by examiner

FLOW BODY FOR AN AIRCRAFT HAVING AN INTEGRATED DE-ICING SYSTEM

CROSS-REFERENCES TO RELATED APPLICATIONS

This application claims the benefit of the International Application No. PCT/EP2020/073968, filed on Aug. 27, 2020, and of the German patent application No. 102019123276.7 filed on Aug. 30, 2019, the entire disclosures of which are incorporated herein by way of reference.

FIELD OF THE INVENTION

The invention relates to a flow body for an aircraft. The invention further relates to a wing having such a flow body, as well as an aircraft having such a wing or such a flow body.

BACKGROUND OF THE INVENTION

In commercial aircraft, the icing of wing components, control surfaces and other flow bodies is often prevented by using de-icing or anti-icing devices. A common approach to achieve this is to heat up respective parts with bleed air from turbofan engines. Also, mechanical de-icing devices are known, which burst ice accretions off. This can be done with pneumatically fillable bags or with actuators that locally deform a skin of the respective component.

In some mechanical de-icing devices sometimes actuators are arranged on an inner surface of the flow body to be de-iced. Such an actuator is capable of locally deforming the skin of the flow body in an elastic manner Thus, ice accretions on an outer side of the skin bursts off. In order to achieve this effect, the actuator requires a sufficient design power to sufficiently deform the respective skin. Thicker skins lead to a higher power requirement than thinner skins. However, thinner skins may be more prone to plastic deformations upon an impact of a foreign body and may in general be more fragile. The use of a thicker skin and more powerful actuators however leads to an increased weight of the respective flow body to be deiced.

SUMMARY OF THE INVENTION

It is thus an object of the invention to propose a mechanical de-icing system or a flow body having such a de-icing system that allows both the use of thicker skin and actuators with a minimum weight at the same time.

A flow body for an aircraft is proposed, the flow body comprising a front skin having a leading edge, at least one internal structural component arranged inside the front skin, at least one lever having a first end, a second end and an attachment point between the first end and the second end, and at least one actuator for applying an impulsive force, wherein the at least one actuator is arranged inside the front skin at a distance thereto, wherein the at least one lever extends from the at least one actuator to an inner surface of the front skin, such that the first end is coupled with the front skin and such that the second end is coupled with the at least one actuator, wherein the attachment point is swivably supported on the at least one internal structural component, wherein a distance between the second end and the attachment point is greater than the distance between the first end and the attachment joint, and wherein the at least one lever and the at least one actuator are designed for applying an impulsive force in a transverse direction to the at least one lever, such that the lever rotates around the attachment point and such the first end urges the front skin to locally elastically deform for removing ice accretion from an outer side of the front skin.

The flow body according to the invention clearly differs from common flow bodies with an integrated de-icing device. A core of the invention lies in providing actuators at a distance to the front skin. By using a lever coupled between the respective actuator and the front skin, a leverage effect can be achieved. Thus, the force applied by the actuator can be multiplied depending on the lever ratio. Consequently, the design power of the actuator may even be far below the design power of an actuator that is directly attached to the front skin. In the following, the main components of the flow body according to the invention are described in further detail.

The front skin may be a substantially surface-like component that is curved to achieve a desired aerodynamic shape. In some cases, it comprises a significant curvature about a spanwise axis to form an aerodynamically advantageous leading-edge region for a wing, a tail plane, a nacelle or another component of an aircraft. For example, the front skin is curved about significantly more than 45°, for example at least 90°. In the course of this curvature, a leading edge separates a second section from a first section. The leading edge may be interpreted as a line that may be close to a stagnation point in a certain flight state, such as the cruise flight. The front skin substantially determines the exterior shape of the flow body and provides a sufficient installation space for the components that are associated with the de-icing function.

The at least one internal structural component arranged inside the front skin may be realized by a variety of different designs. For example, the at least one structural component may comprise a spar that is arranged along a spanwise direction of the flow body. The spar can be a surface-like component that is attached to two opposed portions of the front skin on its interior surface. For this, the spar may comprise flanges along two opposed edges that are used for attaching the spar to the front skin. The spar may further comprise one or a plurality of cutouts in order to reduce the weight of the spar. The spar may thus comprise a design that ranges from a close, flat component to a skeletonized framework-like element. Such an interior structural component supports the front skin.

Another option for an internal structural component may be a plurality of elongated stiffening components having a curved cross-section for increasing their stiffness. They may be attached to an interior surface of the front skin and extend in a spanwise direction. Often, they are referred to as stringers and are often arranged parallel to each other.

Further, the at least one structural component may be realized as a rib, which comprises a shape that is at least partially flat and extends between two opposed portions of the front skin. Such a rib is a stiffening component, which is usually arranged parallel to a chordwise axis, i.e., the x-axis or the longitudinal axis, if the flow body is a part of a wing or a tail plane.

The flow body is not limited to comprising only one internal structural component. It may also comprise two or more internal structural components of the same or similar kind that are distributed inside the flow body. For example, a plurality of stringers is arranged on the inner surface of the front skin parallel to each other. A plurality of ribs may be distributed along a spanwise axis and aligned parallel to each other. Still further, parallel spars may be provided at different chordwise locations, such as a front spar and a rear spar.

For being able to apply a force into a lever, a respective actuator requires a sufficient support. Thus, it is feasible to attach the actuator to an internal structural component, which supports the actuator and provides a reaction force when the actuator applies a force impulse. The interaction with the lever allows to place the actuator at a clear distance to the front skin.

In turn, the lever may be an elongated component that extends from a respective actuator to a certain position on the interior surface of the front skin, which is to be de-iced. As the lever needs to transfer a certain force to the front skin, it should be designed in a manner to withstand a resulting bending moment.

The lever is swivably supported on an internal structural component. As indicated above, a plurality of these may be arranged inside the flow body. Thus, the respective lever may be arranged on the same internal structural component as the respective actuator or on a different one. The actual installation position of the attachment point of the lever depends on the desired lever ratio. The lever ratio in turn may follow a trade-off between a possible actuator amplitude and the desired magnitude of the deformation of the front skin.

Coupling the attachment point with the respective structural component is to be understood as swivably coupling or connecting the lever at its attachment point to the respective structural component. By driving the second end of the lever, the lever swivels around the attachment point and the first end moves and vice-versa. Thus, at the attachment point, a fulcrum is created. For achieving this, a pin may be placed inside a borehole arranged at the attachment point of the lever. Also, at the attachment point the lever itself may comprise a pin-like projection that is inserted into a borehole of the respective structural component. Other more or less sophisticated joints or bearing arrangements may be provided.

The actuator may be coupled to an external power source, such as an electrical outlet controlled by a control unit. The control unit may be arranged inside the flow body or separate therefrom and may be coupled with an electrical power source. It may be desired to design the control unit such that it is capable of applying pulses of electrical energy to the at least one actuator, such that the actuator applies force pulses to the front skin.

Altogether, the flow body according to the invention comprises a beneficial mechanical de-icing device that does not require actuators with a high power demand and a substantial weight. Instead, by using a certain leverage effect, smaller actuators can be used to achieve efficient de-icing and a low weight at the same time.

Preferably, the distance between the second end and the attachment point is at least 1.5 times the distance between the first end and the attachment point. The lever ratio is thus at least 1.5 and the force applied by the at least one actuator is at least 50% higher through the lever. For small parts, such as, e.g., outboard slats, achieving a higher lever ratio may be difficult. However, in parts with a sufficient installation space it may be possible to provide a lever ratio of at least 2 or even higher lever ratios of 3.4 or more.

It is further preferred that a plurality of levers and associated actuators is distributed along the spanwise direction of the flow body. This allows to de-ice a larger area of the flow body through individual elastic deformations along the area in the spanwise direction. By providing a plurality of small elastic deformations distributed along a certain extension may also efficiently remove ice accretions. It may be feasible to control the respective spanwisely distributed actuators in such a way that a sequence of elastic deformations with subsequent force pulses of subsequent actuators or of two or more groups of actuators is initiated.

In an advantageous embodiment, the at least one internal structural component comprises a support frame that extends along a spanwise direction of the flow body and that supports the at least one lever. The support frame may be attached to the front skin and/or to another internal structural component. For example, a support frame may be attached to a plurality of ribs that are distributed along a spanwise axis. It may also be attached to an upper part of the interior surface of the front skin and a lower part of the interior surface of the front skin. The support frame is capable of providing a sufficiently strong basis for the attachment points of the levers.

As indicated, the support frame may be attached to stiffening ribs of the flow body. The stiffening ribs may comprise a distance to each other in the spanwise direction. For example, the support frame may be supported on two laterally opposed stiffening ribs. Further, the support frame may reach through at least one stiffening rib arranged between the laterally opposed stiffening ribs.

In a further advantageous embodiment, the at least one internal structural component comprises a rear spar that extends along a spanwise direction of the flow body and that supports the at least one actuator. It is preferably arranged at a clear distance to the support frame, if such is installed. The rear spar may be commonly found in flow bodies and act as a stiffening component. Hence, arranging the actuators on the rear spar does not necessarily lead to an additional support component and the rear spar provides a further function besides stiffening the flow body.

Preferably, the front skin comprises a first section and a second section, which are separated by the leading edge, wherein at least one first lever is coupled with a portion of the front skin arranged in the first section and wherein at least one second lever is coupled with a portion of the front skin arranged in the second section. Often, ice accretions accumulate on the leading edge and extend along both sections in a downstream direction. Thus, providing mechanical deformations in both sections may reduce the strength of deformation at a region about the leading edge. Also, it may lead to an increased de-iceable surface area.

The at least one lever may comprise at least one seesaw or at least one rocker. Such a lever may be designed to be substantially straight. It allows to transfer large forces and the support may be simple.

Advantageously, a plurality of levers is coupled with a single actuator. Thus, an actuator may apply force impulses to a plurality of levers to provide a plurality of elastic deformations at different spots of the front skin. This allows to reduce the number of actuators and may thus simplify the control of the de-icing system. Furthermore, if the lever ratio is larger than the number of the levers, the actuator does not need to require more power than a conventional actuator directly attached to an interior side of the front skin. The levers of the plurality of levers may preferably be arranged parallel to each other. However, they may also extend into different directions, based on the size of the respective actuator and the desired force distribution.

If the thickness, curvature or material of the front skin changes in a spanwise direction, it may be possible to use a plurality of levers with a lever ratio that is adapted to the local characteristics of the front skin. Hence, the same kind of actuators may be used throughout the flow body and may be connected to a single or a plurality of control units of the same kind, while the individual levers provide an adaption to the local characteristics of the front skin.

It is preferred that the at least one actuator comprises a plurality of actuators. These may be distributed along at least one extension axis, such as the spanwise axis. However, they may also be arranged on the same spanwise position but at a vertical distance to each other.

The flow body may comprise a first region and a second region, wherein a material thickness in the second region is greater than in the first region, and wherein the flow body comprises at least one additional actuator arranged directly on the front skin in the first region, while the at least one lever is coupled with the front skin only in the second region. With a thinner front skin, the use of actuators with a relatively low design power is sufficient. However, it may be subject to an individual decision at which thickness ratio the additional actuator could be used.

It may also be feasible to install additional actuators directly at the front skin in positions where there is insufficient installation space for a lever.

The second region may exemplarily be adjacent to a stiffening rib. Here, the front skin may comprise a greater thickness compared to further distanced regions of the front skin.

As indicated above, the flow body may further comprise a control unit coupled with the at least one actuator for selectively initiating the at least one actuator to apply a force impulse. The control unit may be an integral part of the flow body, such that merely a power and data or signal line is required for coupling the de-icing system of the flow body with a central power and control system of the respective aircraft.

The invention further relates to a wing for an aircraft, having at least one flow body according to the above description. The flow body may exemplarily be a leading-edge component. As such, the flow body may be a movably supported flow body. For example, it may be realized as a droop nose or a leading edge slat, which is capable of providing a translational and rotational motion. As an alternative or in addition thereto, the wing may comprise a flow body in the form of a fixed leading-edge component, which remains at a fixed location. Preferably, the same flow bodies may be arranged on both wings of a commercial aircraft exemplarily in a mirror-inverted, symmetrical manner.

The invention still further relates to an aircraft having at least one wing according to the above description or at least one leading-edge component according to the above description. The aircraft may preferably be a commercial aircraft, a transport aircraft or a military aircraft. It may comprise at least one turbofan or turboprop engine, by which the aircraft may reach into a flight envelope where icing may be experienced particularly during take-off and landing.

BRIEF DESCRIPTION OF THE DRAWINGS

Other characteristics, advantages and potential applications of the present invention result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

DETAILED DESCRIPTION OF EXEMPLARY EMBODIMENTS

Figure 1:
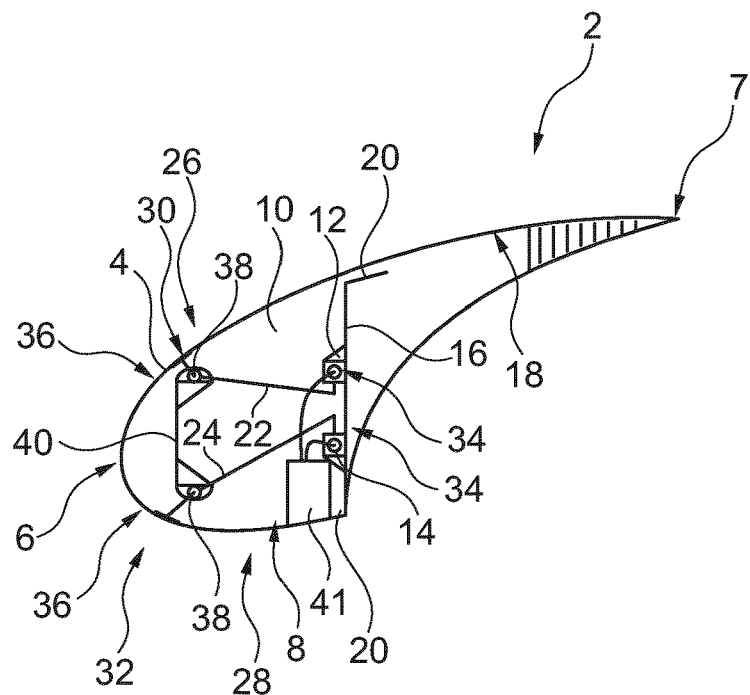
FIG. 1 shows a flow body in a cross-sectional view.

FIG. 1 shows a flow body 2 for an aircraft. In this illustration, the flow body 2 is realized in the form of a leading-edge slat, which may be a part of an aircraft high lift system. Thus, the flow body 2 is a movable flow body. However, this is merely an example and other flow bodies may be realized with the same core features according to the invention.

The flow body 2 comprises a front skin 4, which has a leading edge 6 and a trailing edge 7. The front skin before has a significant curvature to provide the desired aerodynamic shape. The leading-edge 6 is arranged as a line extending in spanwise direction. At least in one flight state, the leading edge 6 is close to or directly at a stagnation point in the cross-sectional perspective. The flow body 2 is prone to icing particularly in the take-off and landing states. Thus, it is advantageous to provide de-icing functions.

For this, a de-icing system 8 is integrated into an interior space 10 of the flow body 2. Here, it comprises a first actuator 12 and a second actuator 14, which are arranged on a spar 16 as an internal structural component in the interior space 10. The spar 16 may be a flat component that is arranged substantially parallel to a vertical axis or perpendicular to a chord axis of the flow body 2. However, this is merely an example and other alignments and orientations are possible. The spar 16 is attached to an interior surface 18 of the front skin 4 through flanges 20. The spar 16 is arranged at a distance to the leading edge 6. It may thus exemplarily be a rear spar 16.

The first actuator 12 and the second actuator 14 are designed to apply impulsive forces. These are introduced into a first lever 22 and a second lever 24 in a transverse direction to their extension. By providing the actuators 12 and 14 at the rear spar 16, the length of the levers 22 and 24 may be maximized with regard to the available space in the flow body 2, which may also increase the possible lever ratios. The spar 16 may be placed at a sufficient distance to achieve a desired lever ratio.

The front skin 4 is divided into a first section 26 and a second section 28, which are separated by the leading-edge 6. The first lever 22 extends to a first area 30 of the first section 26. The second lever 24 extends to a second area 32 of the second section 28. Thus, a first end 34 of both levers 22 and 24 is coupled with the respective actuator 12 and 14 and a second end 36 of both levers 22 and 24 is coupled with the front skin 4. Both levers 22 and 24 comprise an attachment point 38, which is swivably supported on a support frame 40 as an internal structural component. The support frame 40 may be attached to the front skin 4, such that it maintains a fixed installation position. By coupling the attachment points 38 to the support frame 40, an impulsive force introduced into the levers 22 and 24 is transferred to the front skin 4.

The force applied to the front skin 4 depends on the lever ratios of the respective lever 22 or 24. Here, the distance between the attachment point 38 and the first end 34 is greater than the distance between the attachment point 38 and the second end 36. Thus, the force applied by the respective actuator 12 and 14 is multiplied through the leverage effect. Consequently, by placing the actuator 12 and 14 at a clear distance to the front skin 4 and by installing the levers 22 and 24, an advantageous de-icing system 8 is provided, which does not require large and powerful actuators to provide a sufficient elastic deformation on the front skin 4.

The actuators 12 and 14 are coupled with a controller 41, which is designed for supplying energy pulses to the actuators 12 and 14, for example electric energy pulses.

Figure 2:
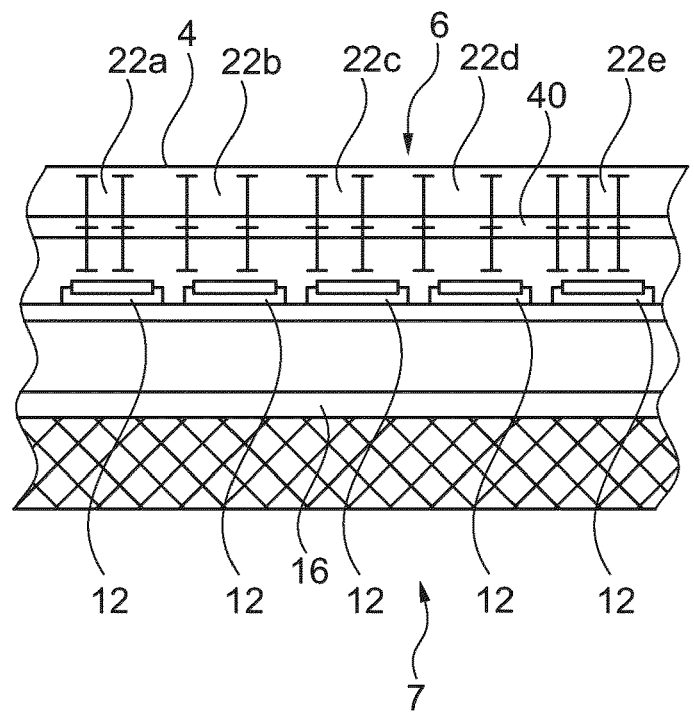
FIG. 2 shows a flow body in a first sectional view.

FIG. 2, a possibly section the view from above the flow body 2 is shown. Here, the support frame 40 is shown to extend along a chordwise axis. The spar 16 holds a plurality of first actuators 12. Also, second actuators 14 are provided, which are covered by the first actuators 12 in this illustration and are thus not visible. For the same reason, only first levers 22 are visible. As their setups differ along the spanwise axis, they are referred to with different reference numerals 22a to 22e. These first levers 22a-22e extend from the first actuators 12 to the front skin 4. For example, three single levers 22e are coupled with a common first actuator 12. In an adjacent position, two single first levers 22d are coupled with the same first actuator 12 and comprise a much greater distance between each other than the levers 22e. The first lever 22c is realized in the form of a rocker or see-saw, wherein at the first end 34 a lateral connection between two halves of the rocker or see-saw is separated. In the adjacent position, a very similar first lever 22b is shown. However, two halves of the first lever 22b are separated at the second end 36. At a leftmost position in the drawing plane, a first lever 22a is shown as a rocker or see-saw. Thus, it is possible to provide different kinds of levers as well as a different numbers of levers at different spanwise positions of the flow body 2.

The various levers 22a-22e may comprise the same lever ratios. However, it may also be possible to provide various different individual lever ratios that are adapted to the local characteristics of the front skin 4. These may include, but are not limited to, the material thickness, the material, the local curvature, and other.

Figure 3:
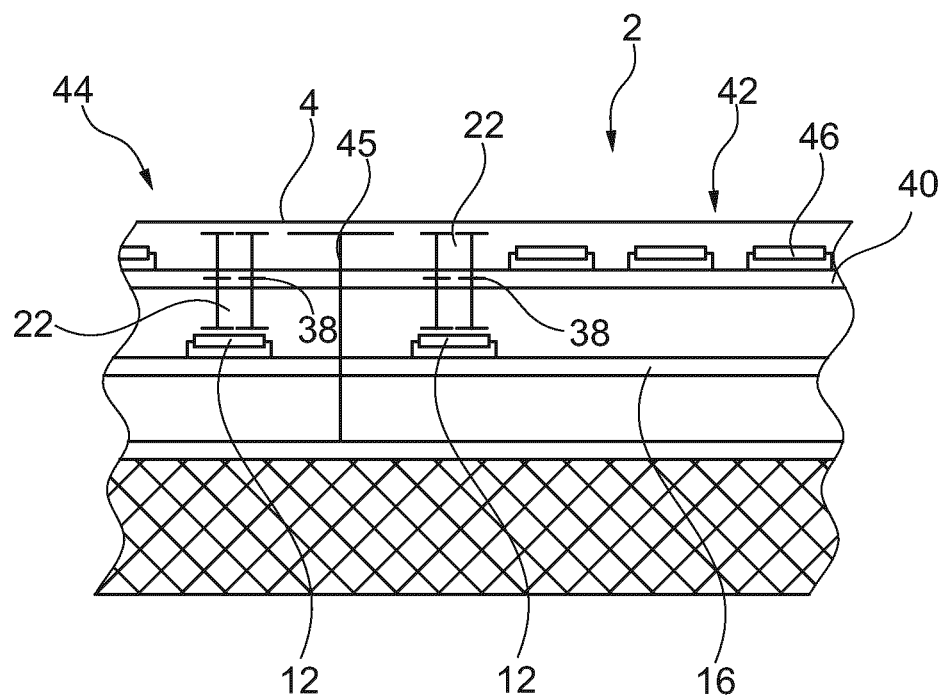
FIG. 3 shows a further flow body in a first sectional view.

FIG. 3 shows the flow body 2 in the same perspective as in FIG. 2. Here, the front skin 4 comprises a first region 42 and a second region 44. The second region 44 may be placed directly adjacent to a stiffening rib 45. The material thickness in the second region 44 is greater than in first region 42. Thus, additional actuators 46 are placed directly on an interior side of the front skin 4 in the first region 42. The required design power of the additional actuators 46 is lower than for the second region 44. There, actuators 12 are arranged at the spar 16 and are coupled with the front skin 4 through first levers 22. Here, also various different individual lever ratios may be provided that are adapted to the local characteristics of the front skin 4.

It is also indicated that a plurality of stiffening ribs 45 may be arranged in the flow body 2 for achieving a certain structural stability. The support frame 40 may be attached to the stiffening ribs 45 and extend along the spanwise direction.

Figure 4:
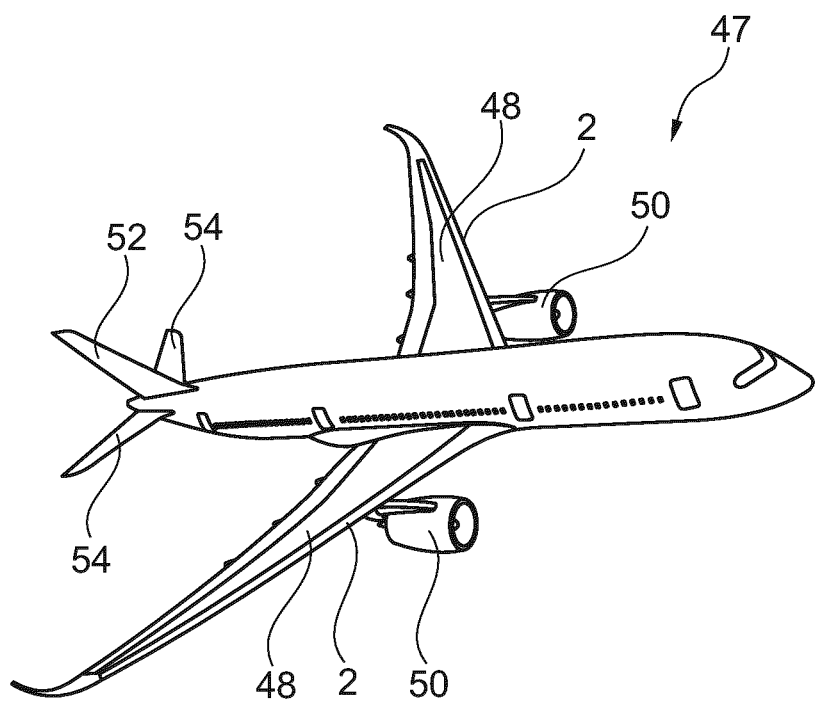
FIG. 4 shows an aircraft.

Finally, FIG. 4 shows an aircraft 47 having wings 48, engines 50, a vertical tailplane 52 and horizontal tailplanes 54. Each of these components may comprise a flow body having a deicing system eight according to the invention. For example, the wings 48 comprise flow bodies 2 at a trailing edge, which may be designed as movable flow bodies 2 described above.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 flow body
4 front skin
6 leading edge
7 trailing edge
8 de-icing system
10 interior space
12 first actuator
14 second actuator
16 (rear) spar/internal structural component
18 interior surface
20 flange
22 first lever
24 second lever
26 first section
28 second section
30 first area
32 second area
34 first end
36 second end
38 attachment point
40 support frame/internal structural component
41 controller
42 first region
44 second region
45 stiffening rib
46 additional actuator
47 aircraft
48 wing
50 engine
52 vertical tailplane
54 horizontal tailplane

The invention claimed is:

1. A flow body for an aircraft, the flow body comprising:
a front skin having a leading edge,
at least one internal structural component arranged inside the front skin,
at least one lever having a first end, a second end and an attachment point between the first end and the second end, and
at least one actuator for applying an impulsive force,
wherein the at least one actuator is arranged inside the front skin at a distance thereto,
wherein the at least one lever extends from the at least one actuator to an inner surface of the front skin, such that the first end is coupled with the front skin, and such that the second end is coupled with the at least one actuator, wherein the attachment point is swivably supported on the at least one internal structural component, wherein a distance between the second end and the attachment point is greater than the distance between the first end and the attachment point, and wherein the at least one lever and the at least one actuator are designed for applying an impulsive force in a transverse direction to the at least one lever, such that the lever rotates around the attachment point, and such the first end urges the front skin to locally elastically deform for removing ice accretion from an outer side of the front skin.

2. The flow body of claim 1, wherein the distance between the second end and the attachment point is at least 1.5 times a distance between the first end and the attachment point.

3. The flow body of claim 1, wherein a plurality of levers and associated actuators is distributed along the spanwise direction.

4. The flow body of claim 1, wherein the at least one internal structural component comprises a support frame that extends along a spanwise direction of the flow body and that supports the at least one lever.

5. The flow body of claim 4, wherein the support frame is attached to stiffening ribs of the flow body.

6. The flow body of claim 1, wherein the at least one internal structural component comprises a rear spar that extends along a spanwise direction of the flow body and that supports the at least one actuator.

7. The flow body of claim 1,
wherein the front skin comprises a first section and a second section, which are separated by the leading edge,
wherein at least one first lever is coupled with a portion of the front skin arranged in the first section, and
wherein at least one second lever is coupled with a portion of the front skin arranged in the second section.

8. The flow body of claim 1, wherein the at least one lever comprises at least one seesaw or at least one rocker.

9. The flow body of claim 1, wherein a plurality of levers is coupled with a single actuator.

10. The flow body of claim 1, wherein the at least one actuator comprises a plurality of actuators.

11. The flow body of claim 1,
wherein the front skin comprises a first region and a second region,
wherein a material thickness in the second region is greater than in the first region, and
wherein the flow body comprises at least one additional actuator arranged directly on the front skin in the first region, while the at least one lever is coupled with the front skin only in the second region.

12. The flow body of claim 11, wherein the second region is adjacent to a stiffening rib.

13. The flow body of claim 1, further comprising a controller coupled with the at least one actuator for selectively initiating the at least one actuator to apply a force impulse.

14. A wing for an aircraft, comprising at least one flow body according to claim 1.

15. The wing according to claim 14, wherein the flow body is movably supported on the wing.

16. An aircraft, comprising at least one wing according to claim 14.

17. An aircraft, comprising at least one flow body according to claim 1.

* * * * *